United States Patent [19]

Häfner

[11] Patent Number: 5,205,368
[45] Date of Patent: Apr. 27, 1993

[54] APPARATUS AND METHOD FOR WEIGHING RAIL-SUPPORTED VEHICLES

[75] Inventor: Hans W. Häfner, Aichach-Walchshofen, Fed. Rep. of Germany

[73] Assignee: Pfister Messtechnik GmbH, Augsburg, Fed. Rep. of Germany

[21] Appl. No.: 733,532

[22] Filed: Jul. 22, 1991

[30] Foreign Application Priority Data
Jul. 26, 1990 [DE] Fed. Rep. of Germany ....... 4023745

[51] Int. Cl.$^5$ ........................................... G01G 21/22
[52] U.S. Cl. ................................................ 177/163
[58] Field of Search ....................................... 177/163

[56] References Cited

U.S. PATENT DOCUMENTS

| | | | |
|---|---|---|---|
| 1,865,446 | 7/1932 | Sears | 177/163 |
| 3,153,460 | 10/1964 | Raskin | 177/163 |
| 3,746,111 | 7/1973 | Berthiaume et al. | 177/163 |
| 3,993,149 | 11/1973 | Harvey | 177/163 |

Primary Examiner—George H. Miller, Jr.
Attorney, Agent, or Firm—Armstrong, Westerman, Hattori, McLeland & Naughton

[57] ABSTRACT

An apparatus and method for measuring vertical forces exerted to a pair of parallel rails by a rail-supported vehicle uses sleepers for supporting said rails which are provided with recesses located below said rails and having inserted therein a force measuring device. An evaluation device may be arranged remotely from said force measuring device(s) for wireless receiving of measuring signals therefrom.

17 Claims, 1 Drawing Sheet

APPARATUS AND METHOD FOR WEIGHING RAIL-SUPPORTED VEHICLES

FIELD OF THE INVENTION

The invention relates to an apparatus and method for weighing rail-supported vehicles and, in particular, a support member or sleeper provided with a force measuring device.

BACKGROUND OF THE ART

EP-A-0 338 553 discloses a scale for rail-supported vehicles comprising a frame for receiving rails and force measuring devices for determining vertical forces acting onto the rails. The frame comprises longitudinal girders arranged in parallel to the rails and lateral girders supporting the rails and resting on the longitudinal girders with the force measuring devices arranged between the rails and the longitudinal girders. Such a complex design is subject to errors in measurement due to strains and twisting of the girders when loaded and warmed up by sun radiation.

The German Laid Open Patent Publication 29 24 190 discloses an apparatus for determining presence and/or the weight of rail-supported vehicles using a piezo-electric force transducer arranged below the rail between the base thereof and a sleeper with the transducer being mounted in a support plate arranged therebetween. Force introduction to the transducer is rather inaccurate without any mechanical lateral compensation and temperature compensation.

U.S. Pat. No. 4,644,805 discloses a force measuring device comprising a pot-type housing having arranged therein a piston forming an annular gap with peripheral inner surfaces of the recess of said housing, said gap being filled with elastomeric material strongly adhering to surfaces in contact therewith and filling a bottom space in said housing, a pressure transducer being in contact with said elastomeric material.

The EP-A-0 281 640 discloses an apparatus for weighing of rail-supported vehicles. The rails are supported in the region of the weighing apparatuses via support members on measuring bars resting on sleepers with force transducers being arranged at the measuring bars. Measuring signals of one or several of the transducers may be added during weighing.

U.S. Pat. No. 4,465,151 discloses a weigh station including a remote controller receiving in a wireless transmission weighing signals denoting axle loadings of passing vehicles.

SUMMARY OF THE INVENTION

It is the principal object of the instant invention to provide an apparatus and a method for weighing rail-supported vehicles having simple design and relatively high measuring accuracy.

It is a further object of the instant invention to provide a support member, specifically a sleeper incorporating a force measuring device.

The apparatus of the invention comprises the features of claim 1. The method of the invention comprises the steps listed in claim 16.

Further improvements of the apparatus and the method of the invention are characterized in the dependent claims.

DESCRIPTION OF A PREFERRED EMBODIMENT

Figure 1:
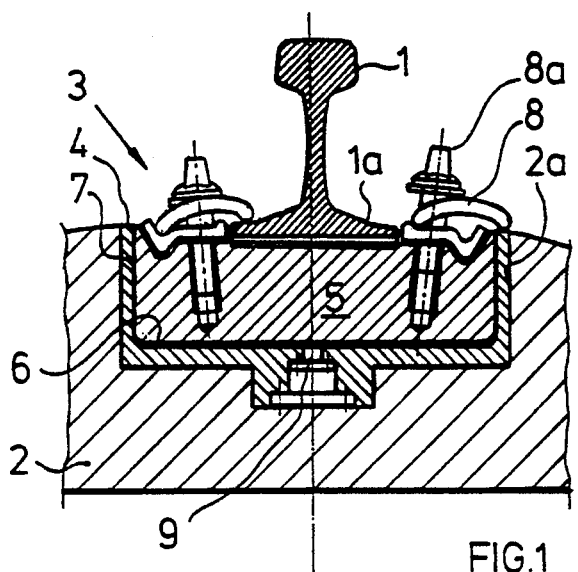
FIG. 1 is a cross sectional view of a track also showing a sleeper in longitudinal section, of a first embodiment of the invention.

FIG. 1 illustrates a rail 1 of a track of a railroad or for any other type of rail vehicle in a cross sectional view. Rail 1 has a base part 1a resting on support beams or sleepers 2 extending normally or laterally thereto and illustrated in sections in FIGS. 1 and 2. Sleepers 2 are preferably made of concrete, but may be formed of wood or metal as well. Base 1a directly supports on a force measuring device 3 essentially comprising a pot-type housing 4 in the interior of which a measuring piston 5 is inserted forming a narrow annular gap 7 with the inner peripheral wall of housing 4, gap 7 being essentially filled with elastomeric material 6 strongly adhering to surfaces in contact therewith. The elastomeric material 6 is essentially bubble-free and may be formed of silicone rubber and fills a lower bottom region of housing 4 below bottom end surface of piston 5.

Rail base 1a is fixed to the upper end of piston 5 by means of clamps 8 pressed against an upper surface of rail base 1a on either side of rail 1 by means of fixing screws 8a. In FIG. 1, left-hand side, the clamping position is illustrated, whilst in the right-hand side clamps 8 are shown in a released position permitting lifting of rail 1. Preferably in a central position of the pot-type housing 4 there is arranged a pressure sensor 9 receiving upon loading of rail 1 a corresponding force via piston 5 and the elastomeric material 6 in gap 7, which material 6 ensures an exact centering of piston 5 making the arrangement insensitive against lateral force components.

The specific design of force measuring device 3, the sensors used and appropriate materials for the elastomeric material 6 may be gathered from U.S. Pat. No. 4,644,805 the full contents of which is made part of this description by reference. Though with the embodiments described a force measuring device 3 is shown for one rail only, it will be appreciated that in the same or alternating sleepers 2 a force measuring device 3 may be inserted for the left and right rails 1 each.

Figure 2:
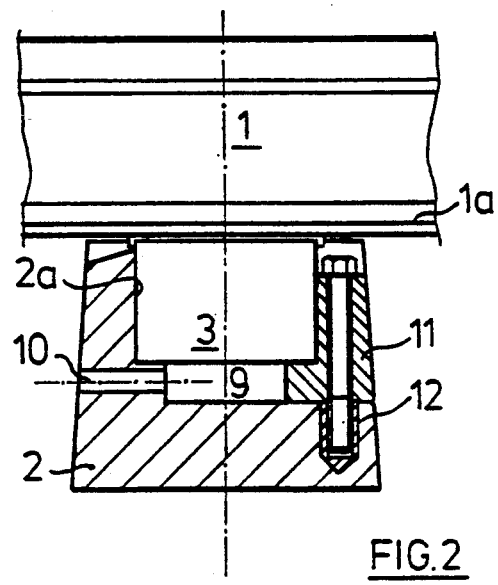
FIG. 2 is an elevational view of a rail also illustrating in cross section the sleeper of FIG. 1.

FIG. 2 is an elevational view of a rail 1 and sleeper 2 in cross section. The left-hand side of FIG. 2 illustrates the incorporation of force measuring device 3 of the embodiment of FIG. 1. Sleeper 2 is provided with a cylindrical recess 2a into which force measuring device 3 is inserted such that piston 5 flushes with its upper end with the upper end of sleeper 2. A cable channel 10 permits extension of an appropriate cable from pressure sensor 9 out of sleeper 2 such that several sleeper 2 individually or in groups may be connected to an evaluation circuit (not shown) for weighing rail vehicles, as lorries or trucks, or the like, stationary or under movement.

Right-hand side of FIG. 2 illustrates a modified mounting of force measuring device 3 with sleeper 2 being provided with a cut or recess 2b (see also FIG. 3) instead of bore 2a, recess 2b being laterally closed by covering support member 11 for fixedly supporting inserted force measuring device 3. Cover 11 may be secured by screws screwed into dowels or threaded inserts 12 embedded in sleeper 2 with a second cover 11 being arranged in a mirror-inverted position at the left-hand side.

Figure 3:
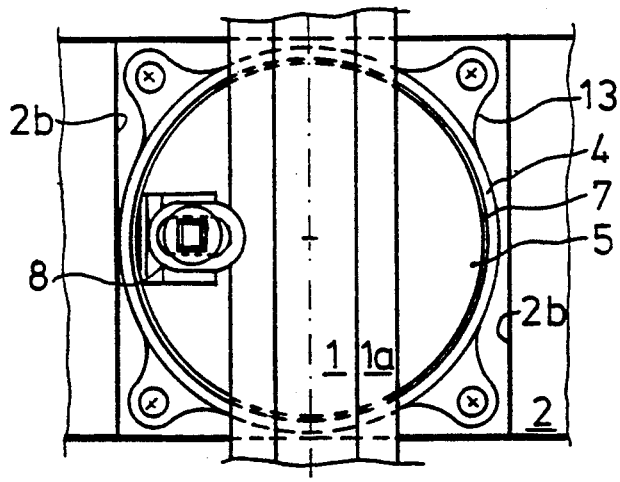
FIG. 3 is a plan view of a railroad track illustrating a modified mounting of the force measuring device used in connection with the invention.

FIG. 3 illustrates a further embodiment of the mounting of force measuring device 3. Housing 4 comprises at its lower portion a fixing flange 13 permitting screwing of housing 4 including force measuring device 3 in recess 2b of sleeper 2. If for a measuring section for rail vehicles specific sleepers are provided, they may have a larger width such that with normal overall height recess 2b does not essentially reduce the stability of the sleeper 2. Recess 2b may be formed either when casting sleepers 2 of concrete or may be incised by means of cutting disks.

It should be noted that base 1a of this embodiment is sunk lower into piston 5, as compared with the embodiment of FIG. 1, in order to further reduce the overall height. In this case the lateral portions of piston 5 according to FIG. 1 having arranged clamps 8 therein are somewhat raised whilst the portions at the periphery of piston 5 above which rail 1 extends, are lowered as well as the upper rim of housing 4. Though piston 5 is illustrated as being cylindrical, it may have an oval or rectangular cross section with rounded edges with gap 7 and housing 4 having a complementary form. Since sleepers 2 are just supported on shingle for test purposes ground pressure may be measured as well.

Though with the embodiments each sleeper 2 has inserted thereto an individual force measuring device 3, several of these force measuring devices 3 may be mechanically combined, f. i. on a plate extending through recesses 2b of several sleepers 2.

If the sleepers 2 are made of non-creeping material, as polymeric concrete, housing 4 may be omitted with piston 5 being fitted into an appropriate recess in the material of sleeper 2 with forming annular gap 7.

According to a feature of the invention there may be a wireless transmission of data captured by pressure sensor 9 to an evaluation apparatus. In such a case pressure sensor 9 is integrally provided with the necessary circuit elements, as amplifier and transmitter elements. Preferably, the electric energy necessary for operating the pressure sensor and its amplifier or transmitter elements are received by the pressure sensor from an energy transmitter, preferably an induction loop arranged at the bottom side of the railroad vehicle, specifically the tracking vehicle or locomotive. Such induction loop means have become known for different purposes, as for inductively operated blocking and braking devices.

The measuring values supplied by the pressure sensor may be stored, displayed and/or printed by the evaluation apparatus which may be arranged in the trailing vehicle or stationary.

By such a method other parameters and measuring values may be determined and evaluated, as exemplary the number of axles of a train.

Inserting the force measuring device into said sleeper in a flushing manner avoids specifically designed sleepers. The elastomeric material filled into said narrow annular gap provides shunting of any horizontal forces away into said sleeper resulting in an accurate measurement of the desired vertical forces even during braking or accelerating of a vehicle. The force measuring device inserted into the sleeper protects sensitive elements from being damaged or deteriorated. The recess may be formed when forming the sleepers or even in situ by using a drilling or cutting device.

I claim:

1. An apparatus for measuring vertical forces exerted on at least one of a pair of parallel continuous rails by a rail-supported vehicle comprising:
   at least one sleeper in form of a bar-type support member extending laterally below said pair of rails; and force measuring means including a receiving member including a pressure sensor inserted in a recess formed in said sleeper at a location below at least one of said pair of rails, and a force introduction member including a piston for supporting said at least one continuous rail resiliently seated within said receiving member.

2. The apparatus of claim 1, wherein said force measuring means comprises a pot-type housing inserted in said recess of said sleeper, a piston being arranged in an interior space of said housing representing said force introduction member and forming a narrow annular gap with a peripheral surface of said interior space and a bottom space between a bottom surface of said interior space and an inner end surface of said piston, said narrow gap and said bottom space being filled with elastomeric material strongly adhering to surfaces in contact therewith and being in contact with a pressure sensor means.

3. The apparatus of claim 2, wherein upper ends of said housing and said piston flush with an upper surface of said sleeper.

4. The apparatus of claim 1, wherein said recess is a lateral recess with said force measuring means being inserted laterally and fixed by a lateral support means.

5. The apparatus of claim 1, wherein said force measuring means include means for wireless transmission of measuring signals.

6. The apparatus of claim 5, wherein said force measuring means include elements for wireless receiving of energy.

7. The apparatus of claim 1, further comprising evaluation means remotely arranged from said force measuring means but in signal communication therewith for evaluating measured values.

8. The apparatus of claim 7, wherein said communication is a wireless communication.

9. The apparatus of claim 7, wherein said evaluation means is provided on a vehicle riding on said rails.

10. The apparatus of claim 1, wherein there are provided a plurality of sleepers whose force introduction means are coupled in groups.

11. An apparatus for measuring vertical forces exerted on at least one of a pair of parallel rails by a rail-supported vehicle comprising:
   a bar-type support sleeper extending laterally below said pair of rails; and having a recess formed in said sleeper at a location below at least one of said pair of rails;
   a cup shaped housing inserted in said recess of said sleeper;
   a piston arranged in an interior space of said housing comprising a force introduction member for supporting said at least one rail and forming a narrow annular gap with an annular surface of said interior space and forming a bottom space between a bottom surface of said interior space and an end surface of said piston, said narrow gap and said bottom space being filled with elastomeric material strongly adhering to surfaces in contact therewith; and a pressure sensor means contacting said elastomeric material in said bottom space, wherein said recess in said sleeper is a bore having said housing fitted thereinto.

12. An apparatus for measuring vertical forces exerted on at least one of a pair of parallel rails by a rail-supported vehicle comprising:

a bar-type support sleeper extending laterally below said pair of rails;

force measuring means inserted in a recess formed in said sleeper at a location below at least one of said pair of rails including a force introduction member including a piston for supporting said at least one rail, and clamping means secured to said force introduction means and engaging said rail for firmly securing thereof to said force introduction means.

13. The apparatus of claim 12, wherein said rail is arranged in a recessed manner in said force introduction means.

14. The apparatus of claim 12, wherein said clamping means are secured to said force introduction means by screws threaded thereinto.

15. An apparatus for measuring vertical forces exerted on at least one of a pair of parallel rails by a rail-supported vehicle comprising:

a bar-type support sleeper extending laterally below said pair of rails; and force measuring means inserted in a recess formed in said sleeper at a location below at least one of said pair of rails;

wherein said sleeper is formed of non-creeping material and said recess is a cylindrical recess having inserted therein a piston comprising a force introduction means and forming a narrow annular gap with a peripheral surface of said interior space and a bottom space between a bottom surface of said interior space and an inner end surface of said piston, said narrow gap and said bottom space being filled with elastomeric material strongly adhering to surfaces in contact therewith and being in contact with a pressure sensor means.

16. A method of measuring vertical forces exerted at least on one of a pair of parallel rails by a rail-supported vehicle comprising the steps:

providing at least one support member extending laterally below said pair of parallel rails with at least one recess at a location below one of said rails;

fitting a force measuring means into said recess, said force measuring means including signal transmission elements;

providing an evaluation means remotely from said force measuring means;

wireless transmitting of measuring signals from said force measuring means to said evaluation means and indicating storing and/or printing evaluation results responsive to said measuring signals.

17. The apparatus of claim 16, wherein said force measuring means includes energy receiving and storing means, further comprising the step of transmitting energy from said remote evaluation means to said force measuring means.

* * * * *